(12) United States Patent
Krauss

(10) Patent No.: US 9,618,624 B2
(45) Date of Patent: Apr. 11, 2017

(54) SPORTS- AND GENERAL POLE ELEMENT INCLUDING ARRANGEMENT FOR OPERATING A HANDHELD GEOPHYSICAL LOCATING DEVICE

(71) Applicant: OKM GMBH, Windischleuba (DE)

(72) Inventor: Andreas Krauss, Fockendorf (DE)

(73) Assignee: OKM GMBH, Windischleuba (DE)

( * ) Notice: Subject to any disclaimer, the term of this patent is extended or adjusted under 35 U.S.C. 154(b) by 0 days.

(21) Appl. No.: 15/019,629

(22) Filed: Feb. 9, 2016

(65) Prior Publication Data

US 2016/0161612 A1   Jun. 9, 2016

Related U.S. Application Data

(63) Continuation-in-part of application No. 13/877,857, filed as application No. PCT/EP2011/064859 on Aug. 30, 2011, now abandoned.

(30) Foreign Application Priority Data

Oct. 7, 2010   (DE) .................... 20 2010 014 054 U

(51) Int. Cl.
*A45B 3/00*       (2006.01)
*G01S 19/19*      (2010.01)
*A45B 3/08*       (2006.01)

(52) U.S. Cl.
CPC .............. *G01S 19/19* (2013.01); *A45B 3/00* (2013.01); *A45B 3/08* (2013.01)

(58) Field of Classification Search
CPC ....................................... A45B 3/00
USPC .............................................. 135/16
See application file for complete search history.

(56) References Cited

U.S. PATENT DOCUMENTS

| | | | |
|---|---|---|---|
| 3,551,804 A * | 12/1970 | Weddle | ............... G01R 31/021 |
| | | | 324/520 |
| 3,828,242 A | 8/1974 | Vann | |
| 4,068,164 A | 1/1978 | Schwartz et al. | |
| 4,719,426 A | 1/1988 | Weiss | |
| 5,197,501 A | 3/1993 | Ragatz | |
| 5,934,300 A | 8/1999 | Breton | |
| 5,973,618 A | 10/1999 | Ellis | |
| 6,356,210 B1 | 3/2002 | Ellis | |
| 6,954,072 B1 | 10/2005 | Schlapp et al. | |
| 7,066,864 B2 | 6/2006 | Olkkonen | |
| 7,336,078 B1 * | 2/2008 | Merewether | ............. G01V 3/15 |
| | | | 324/326 |

(Continued)

FOREIGN PATENT DOCUMENTS

| | | |
|---|---|---|
| DE | 10 2005 057 054 | 6/2006 |
| DE | 10 2005 011 264 | 9/2006 |
| DE | 10 2005 057 154 | 5/2007 |

*Primary Examiner* — Noah Chandler Hawk
(74) *Attorney, Agent, or Firm* — Hamre, Schumann, Mueller & Larson, P.C.

(57) ABSTRACT

The invention relates to a sports- and general pole element. The pole element includes components for an arrangement for operating a handheld geophysical locating device with at least one sensor, a power supply, an operating unit, and an interface for wireless data transmissions, wherein the components are arranged concealed in a body of the sports- or general pole element and wireless transmission of locating data is provided through the interface to a mobile evaluation- and display unit.

10 Claims, 15 Drawing Sheets

(56) References Cited

U.S. PATENT DOCUMENTS

| | | | |
|---|---|---|---|
| 8,653,814 B2* | 2/2014 | Heckhausen | F41H 11/136 |
| | | | 324/260 |
| 9,395,392 B2* | 7/2016 | Droit | G01R 9/00 |
| 2008/0251110 A1 | 10/2008 | Pede | |
| 2010/0154850 A1* | 6/2010 | Schulz | A45B 9/02 |
| | | | 135/66 |
| 2010/0319740 A1* | 12/2010 | Willey | A45B 1/04 |
| | | | 135/66 |
| 2011/0061697 A1 | 3/2011 | Behrenbruch et al. | |

* cited by examiner

SPORTS- AND GENERAL POLE ELEMENT INCLUDING ARRANGEMENT FOR OPERATING A HANDHELD GEOPHYSICAL LOCATING DEVICE

The invention relates to a sports- and general pole element with features according to patent claim 1.

Several embodiments for operating geophysical locating devices made by OKM GmbH, Windischleuba, are known.

It is known for example from DE 10 2005 011 264 A1 to perform object location in a predetermined area through magnetic field sensing. For this purpose the area is divided into a virtual search field with measuring points distributed in a grid over the search field. Thus, a current position of a magnetic field sensing device that is being moved in the area is captured through a position detection device and transposed into a position within the search field. When reaching an area position of the magnetic field sensing device that corresponds to a measuring point within the search field, a magnetic field measurement is performed. The magnetic field values that are determined in the search field location specific within the area are processed to generate an image. It is a disadvantage of this method that a large number of devices are required. In order to generate a representation that visualizes the location values and the measurement values, a magnetic field sensing device, a position detection system, a processing device for location- and measurement value data and a processing and display device are required. Therefore, the method is rather time- and labor intensive.

In case only one person wants to search for objects, a device according to the teachings of DE 10 2005 057 054A1 is quite practicable. The device described therein is based on a handheld geophysical locating device through processing magnetic field changes, wherein the device includes flux gate sensors and an evaluation and display unit. The flux gate sensors are arranged in a separate probe, wherein the display unit is configured as a pair of video glasses, and wherein a connection is provided between the evaluation unit and the pair of video glasses.

However, it has become apparent that overt searching for objects hidden in the ground has numerous disadvantages. Thus, attention of the public is drawn to the user and the search area through the use of the detection devices. Often pedestrians enter the search area and disturb the user of the device during the search in that, for example, ground markers are stepped on. Furthermore, some pedestrians may be motivated to look for objects that are hidden in the area themselves so that the chances for everybody to find valuable objects are reduced.

Thus, it is an object of the present invention to provide an improved arrangement for operating a portable, in particular handheld geophysical locating device, wherein simple handling has to be assured and simultaneously a locating device is provided which is not apparent as such for third parties.

The object is achieved with a sports- and general pole element with the features of claim 1. The sports. and general pole element includes components for an arraignment for operating a handheld geophysical location device including at least one sensor, a power supply an operating unit and an interface for wireless data transmissions wherein the components are arranged concealed in the sports and general pole element and the interface provides wireless data transmissions of location data to a mobile evaluation and display unit. The dependent claims include advantageously embodiments and improvement of the sports- and general pole element.

Thus the object is achieved by an arrangement for operating a portable, in particular handheld geophysical locating device in which a sensor and a power supply, an operating unit and an interface for wireless data transmissions according to the feature combination according to patent claim 1, in a shape which corresponds to a sports- and a general pole element and which is also easily useable as a sports- and general pole element.

In a first embodiment the sensor is configured as a passive differential sensor. Thus a first partial sensor is arranged as a reference sensor in the portion of the handle of the sporting and general purpose pole element and a second partial sensor is arranged as a base sensor in the portion of the pole tip of the sporting and general pole element. Thus the second partial sensor detects the strength of the magnetic field close the ground passively whereas the first partial sensor detects the magnetic field strength in a portion of the handle, thus at a sufficient distance from the ground.

In an advantageous embodiment the mobile evaluation and display unit is s mobile telephone or a Personal Digital Assistant (PDA).

In one embodiment the interface for wireless data transmission is a blue tooth and/or a WIFI interface. A user of the sporting and general pole element can thus carry the mobile telephone or the PDA either openly or concealed, whereas the magnetic field data detected by the components of the geophysical location device within the sports and general pole element are wirelessly transmitted to the mobile telephone or the PDA and collected therein for subsequent processing.

In an advantageous embodiment the sports or general pole element is a hiking pole or walking pole or an umbrella or a sun umbrella or a Nordic walking pole. Basically all types of poles or pole shaped elements can be used to conceal the geophysical location components. Furthermore the sports and general purpose pole element including the location components included therein can be easily used as a hiking pole, a walking pole, an umbrella a sun umbrella or also a Nordic walking pole.

In one embodiment the sports or general pole element includes a handle that is substantially oriented in a direction of the longitudinal axis of the sporting and general pole element. The sporting or general pole element is thus supported with its longitudinal axis substantially perpendicular to the surface of the land that is to be detected and walked over and helped by the user. This position is assumed when the sporting or general pole element is used for geophysical locating as well as a walking aide or umbrella. Thus it is not determinable for an external observer whether geophysical locating is currently performed or whether the user of the stick walks the land conventionally and without particular intent, and geophysical locating can be performed in a concealed manner.

In one embodiment the handle of the sporting and general pole element includes the operating unit and/or the power supply. The user can therefore inconspicuously operating processes in the locating components concealed in the pole by using the hand that grips the handle without an external observer noticing it. Furthermore the handle and thus also the hand of the user conceals the power supply of the locating components from external viewers.

In another embodiment the sports- and general purpose pole element includes a tubular telescope rod. The sporting and general purpose pole element can thus be stored in a space saving manner when it is not being used.

In combination therewith the telescope rod includes at least one length arresting device and a spiral cable is arranged within the telescope rod, wherein the spiral cable performs a self acting contraction of the telescope rod when the length arresting device is disengaged. Thus, the telescope rod shortens self acting to its minimal length as soon as the length arresting devices are disengaged.

In one embodiment the spiral cable arranged within the telescope rod is configured as a radio antenna for a radio receiver that is arranged in the portion of the handle. Thus the spiral cable performs two functions.

In one embodiment the spiral cable connects a first passive partial sensor included in the handle portion and a second passive partial sensor included in the pole tip, wherein both partial sensors form a differential sensor arrangement. In this embodiment the spiral cable is an element of the geophysical locating components within the sporting and general purpose pole element.

In another embodiment the sporting and general purpose pole element includes a radio receiver unit. The mobile evaluation and display unit can furthermore include a memory unit. According to the invention, the geophysical locating components are provided concealed, this means camouflaged in and/or at the sports pole element or a general pole element, wherein data is transferrable to a mobile evaluation and display unit through the interface for wireless data transmissions.

It is appreciated that it is irrelevant in the arrangement according to the invention for operating a locating device on which principle the detection of hidden objects is based. Thus, for example flux gate sensors can be used.

Preferably, as stated supra at least two sensors are arranged in or at the general pole element.

Sports- or general pole elements are for example hiking poles, walking poles, umbrellas, sun umbrellas or Nordic walking poles, wherein the pole elements are advantageously provided with a handle. By a arranging the components associated with the locating device in or at a general pole element, the locating device is not detectable as such so that a user does not run the risk to be discovered by pedestrians when performing his activity.

Components associated with the locating device can also be arranged at or in the handle associated with the pole element. Installed in the handle or pole element subsequently stands for a component being completely installed in the handle and enveloped by the handle, so that the component is not visible. An arrangement in an interior of the pole element is also feasible.

The designation "at the general pole element" or "at the handle" states that the component is not arranged completely concealed, but that it can be discovered when looking at the locating device. However, the components are configured in this case so that they are not detectable as components associated with a locating device.

The power supply, for example, is a battery or an accumulator. Also attaching a power generating solar cell is conceivable.

The operating unit is configured for example as start-stop key. It is furthermore conceivable to arrange a trigger for manual measuring impulses. This trigger can also be integrated in the start-stop key.

Advantageously, the operating unit is arranged at the handle of the general pole element.

The mobile evaluation- and display unit in a particularly preferred embodiment of the invention is a mobile telephone or a PDA. The data to be processed is transmitted by the locating device through the recited interface for wireless transmission to the mobile telephone or the PDA. The transmission is advantageously performed through Bluetooth, wherein infrared transmissions or other wireless communication options can also be used for data transmissions.

A program is stored on the mobile telephone through which the measurement values can be received by the locating device via Bluetooth and can be simultaneously represented as a three-dimensional diagram. This facilitates moving, rotating or zooming the diagram.

Using a mobile telephone as evaluation- and display unit has the additional advantage that this everyday item does not reveal that anybody is looking for hidden objects. Video glasses or large screens, however, attract the curiosity of third parties.

Advantageously the mobile evaluation- and display unit includes a memory. In a mobile telephone, this is for example a flash card on which measurements of the display device can be stored in order to be able to transmit them to a computer after the positioning process.

Through a GPS module integrated into the mobile telephone or the PDA, also the GPS coordinates of the measuring points can be stored and used for additional navigation.

It can be furthermore provided to arrange a radio receiving unit in or at the general pole element so that the arrangement can be used for example as a hiking pole with radio function when the mobile telephone is not being used. This explanation can be provided for example when third parties ask questions regarding the start/stop keys arranged at the handle unit.

In order to be able to imitate the appearance and the shape of a hiking pole even more closely, the general pole element can be configured as a telescope pole.

The invention shall now be described in more detail based on embodiments with reference to drawing figures, wherein.

Figure 1:
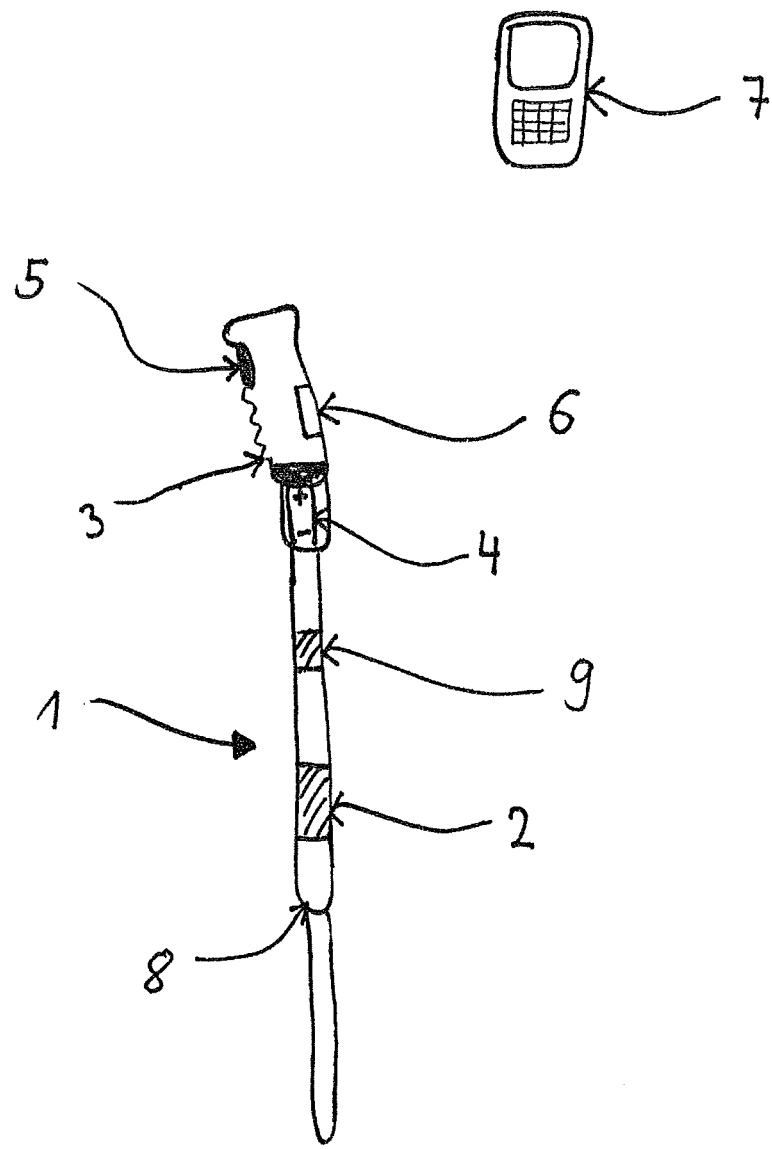
FIG. 1 illustrates a schematic view of a sports and general pole element with an integrated and concealed handheld geophysical locating device.

Thus, FIG. 1 illustrates a schematic view of a sports and general purpose pole element with a handheld geophysical locating device integrated and concealed therein configured as an arrangement for a handheld geophysical locating device which includes several components which are arranged in or at a general pole element 1 in a disguised manner.

The components initially include at least one sensor 2, a power supply which is a battery 4 in a battery compartment in the illustrated embodiment, an operating unit 5 and an interface 6 for wireless or line data transmissions.

The sports and general pole element 1 is configured as a hiking pole with a handle 3, wherein the detection sensor 2 is arranged in an interior of the pole element 1 and enveloped by the tube system so that the sensor 2 cannot be discovered.

The battery 4 and the operating unit 5, however, are arranged in the handle 3, wherein the battery 4 is completely enveloped by the material of the handle 3 and the operating unit 5 includes a start/stop key which is arranged at the handle and visibly points in outward direction. The interface for wireless data transmissions is also arranged at the handle 3.

Thus, measurement values determined by the sensor 2 can be wirelessly transmitted through the interface 6 to an evaluation and display unit 7 which is provided as a mobile telephone in the illustrated embodiment. A program stored in the mobile telephone evaluates the determined data and can graphically display the data in the display field. For an interface that is only configured for wireless data transmissions the provided transmission and receiving components are concealed within the handle and not visible from outside, wherein the radio signals permeate the body of the handle.

Furthermore, a radio receiver 9 is installed in the pole element 1 which is configured as a telescopic pole 8.

When pedestrians approach the radio receiver 9 can be activated through the operating unit 5 so that no explanations regarding the configuration of the hiking pole have to be provided.

Figure 2:
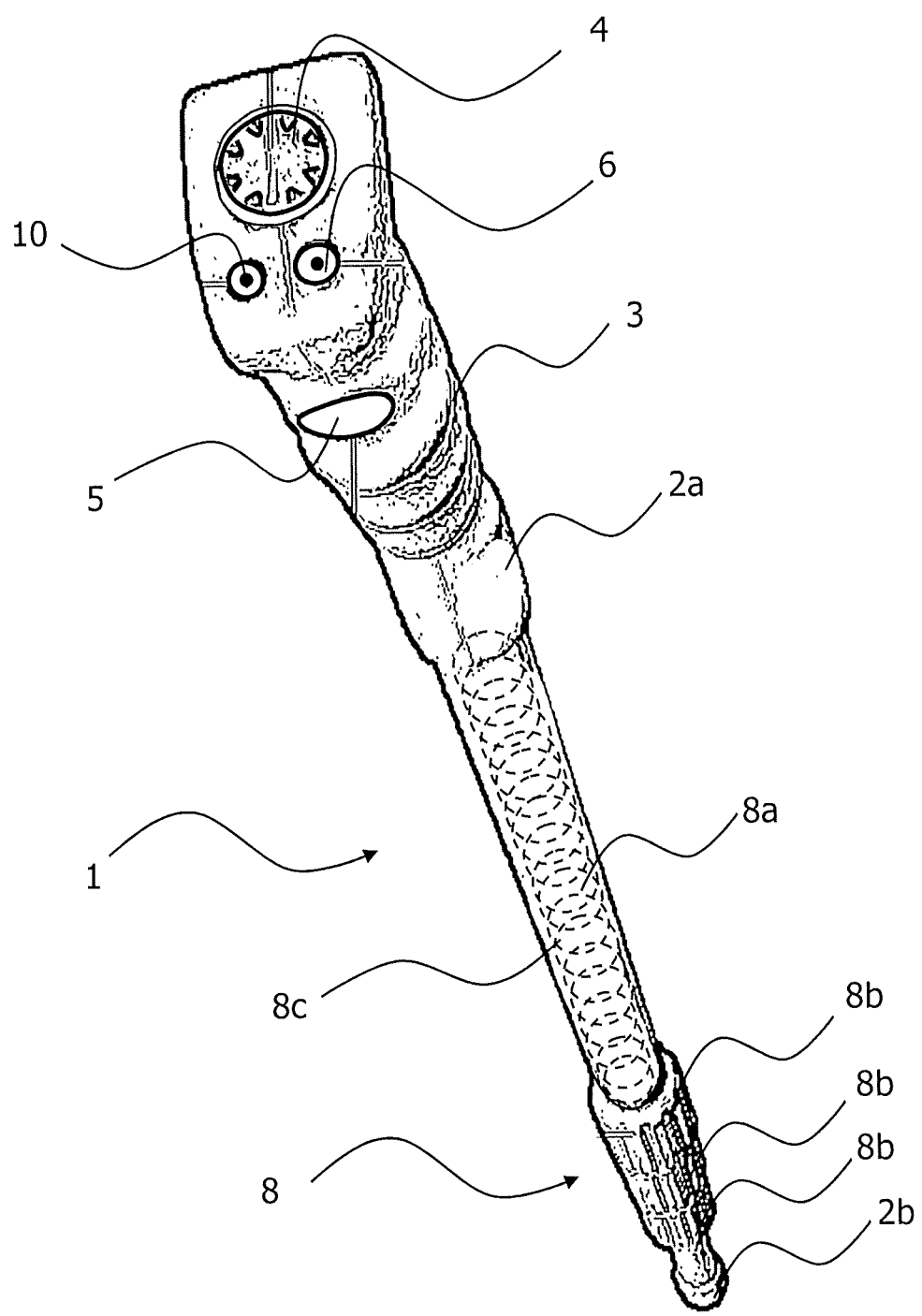
FIG. 2 illustrates a perspective view of an embodiment of the sports and general pole element in contracted condition.
Figure 3:
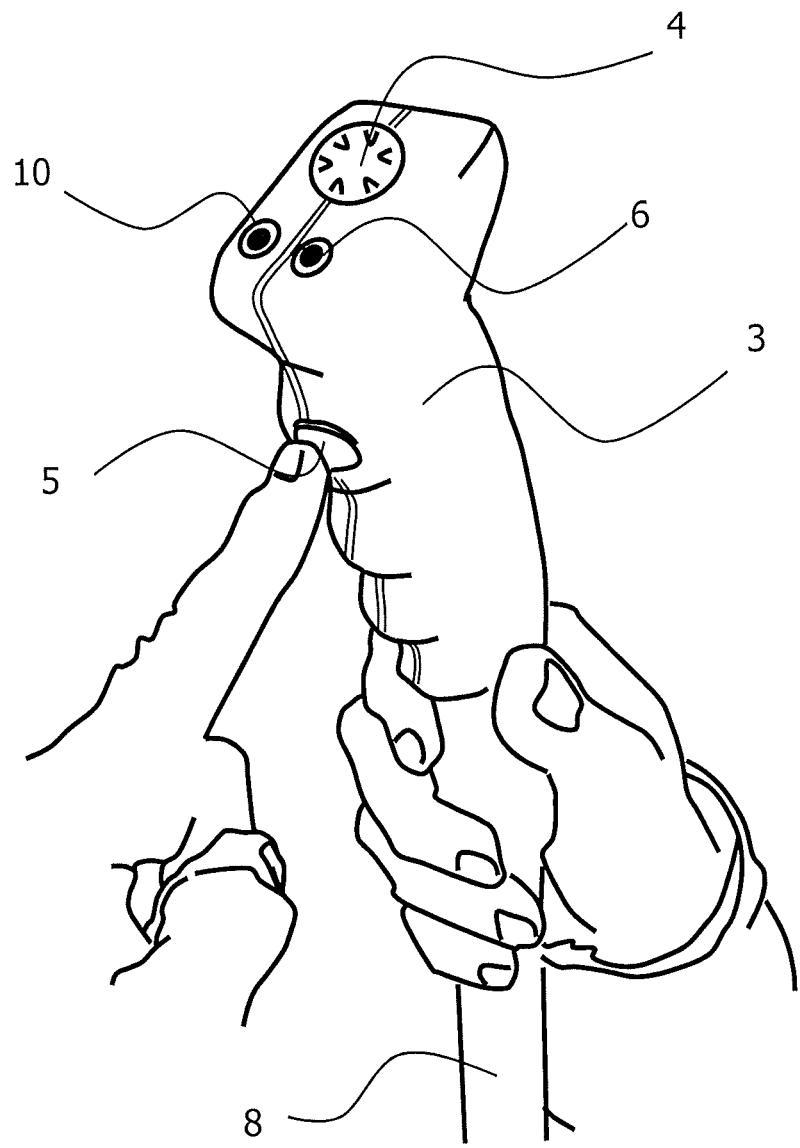
FIG. 3 illustrates an embodiment of a handle portion with integrated and concealed components.

FIG. 2 illustrates a perspective view of another embodiment of the sports and general pole element in contracted condition. FIG. 3 illustrates an exemplary embodiment of the handle portion with components integrated therein.

In this embodiment the telescope rod 8 is made from a series of telescopic segments 8a pushed into each other, wherein FIG. 2 only shows the segment directly adjacent to the handle 3. The telescope segments are kept in position by the length arresting devices 8b.

A spiral cable 8c extends within the telescope rod 8. The spiral cable thus connects a first partial sensor 2a in the portion of the handle 3 with a second partial sensor 2b in the portion of the pole tip oriented towards the base and thus runs through the entire telescope rod 8. When the telescopic segments are pulled apart the spiral cable is stretched and in parts a pull force over the entire length of the telescope rod, wherein the pull force is received by the length arresting devices. When disengaging the length arresting devices the telescope rod is pulled together, wherein the telescopic segments are pushed into each other. Thus the telescopic rod shortens self-acting. The internal spiral cable can also be used as an antenna that extends in the telescopic rod for receiving a radio signal.

The handle 3 includes a battery compartment for a battery 4 that is inserted therein and supported in the handle in this embodiment. The battery compartment is provided with a cover. In the portion of the handle 3 there is furthermore the recited operating unit 5. The operating unit 5 in this embodiment is simple heating device which facilitates activating the geophysical locating components arranged in an interior of the handle, in particular the two partial sensors 2a, 2b interacting therewith, but also the wireless data transmission devices interacting therewith to the external evaluation and display unit.

The keying device is thus directly arranged in the portion of the fingers of the user reaching around the handle and can thus be operated in an inconspicuous manner.

The keying device can thus be configured multi functional. Upon a first keying for example the radio receiver included in the pole can be turned on, a second keying generates an automatic transmitter search run of the radio receiver unit. A third keying eventually switches the radio receiver off and activates the geophysical locating components within the pole, whereas a fourth keying switches all the electronics in the pole off.

The handle furthermore includes an interface 6 which provides a jack for inserting a data and/or audio cable in the instant embodiment in addition to the recited wireless data transmission. Thus the electronic components hidden in the handle or in the sports and general pole element can also be line connected with external devices. This relates in particular to connecting a head set through which audio outputs for the user of the sports and general pole element can be provided for example to a headset. The user can thus be provided with a signal tone which indicates an object hidden in the ground which has been registered by the sensor arrangement including the partial sensors 2a and 2b.

In case the handle 3 or the sports and general pole element includes components for receiving radio signals the jack also facilitates putting out a received radio program to the user of the pole through a head set.

The handle 3 furthermore includes a signal lamp 10 which can be optionally also configured as a LED. In the instant embodiment the signal lamp includes plural color outputs which signal the operating condition of the electronic components within the sports and general pole element. Thus for example operative readiness of the internally concealed geophysical locating components is indicated by a green color output of the signal lamp after the user of the pole has activated the components through the operating unit 5 thus by actuating the keying device.

Furthermore the signal lamp can signal by a color change and/or through respective flashing signals with different flashing frequency that an object that is hidden in the ground has been detected or a receiving quality of a radio signal received by the radio receiver can be indicated by a color change between red and green.

Figure 4:
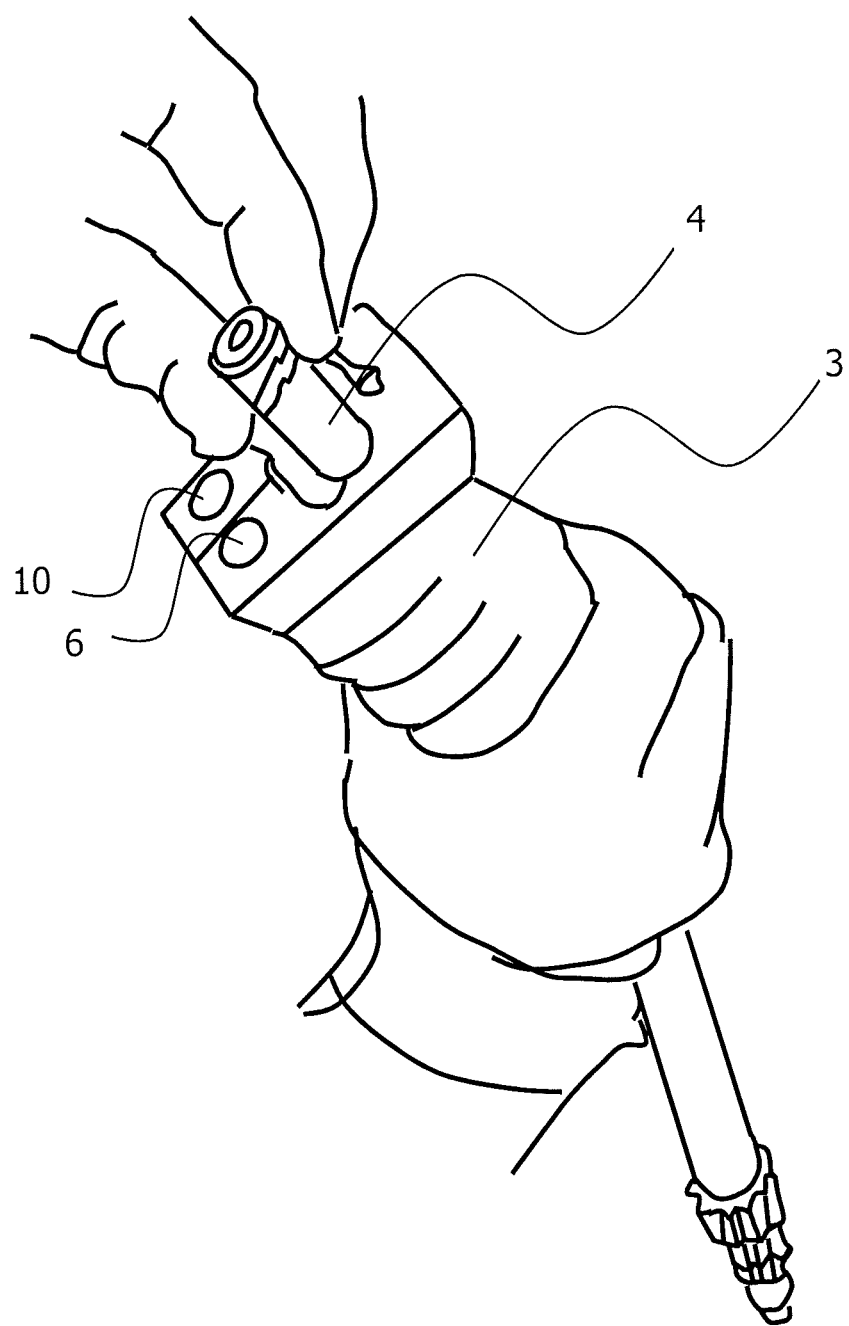
FIG. 4 illustrates a battery swap in the handle portion.

FIG. 4 illustrates a battery exchange in the handle portion. At least one battery 4 is inserted into the battery compartment arranged in the handle 3 and the battery compartment is subsequently closed with a respective cover. After insertion of the battery the signal lamp 10 can briefly indicate a charge condition of the battery. Thus it is possible for example to display a bright green light for a high charge level, a weak green light for a medium charge level and a red light for a low charge level of the battery. A display of this type is particularly useful when a rechargeable accumulator shall be used for a battery.

Figure 5:
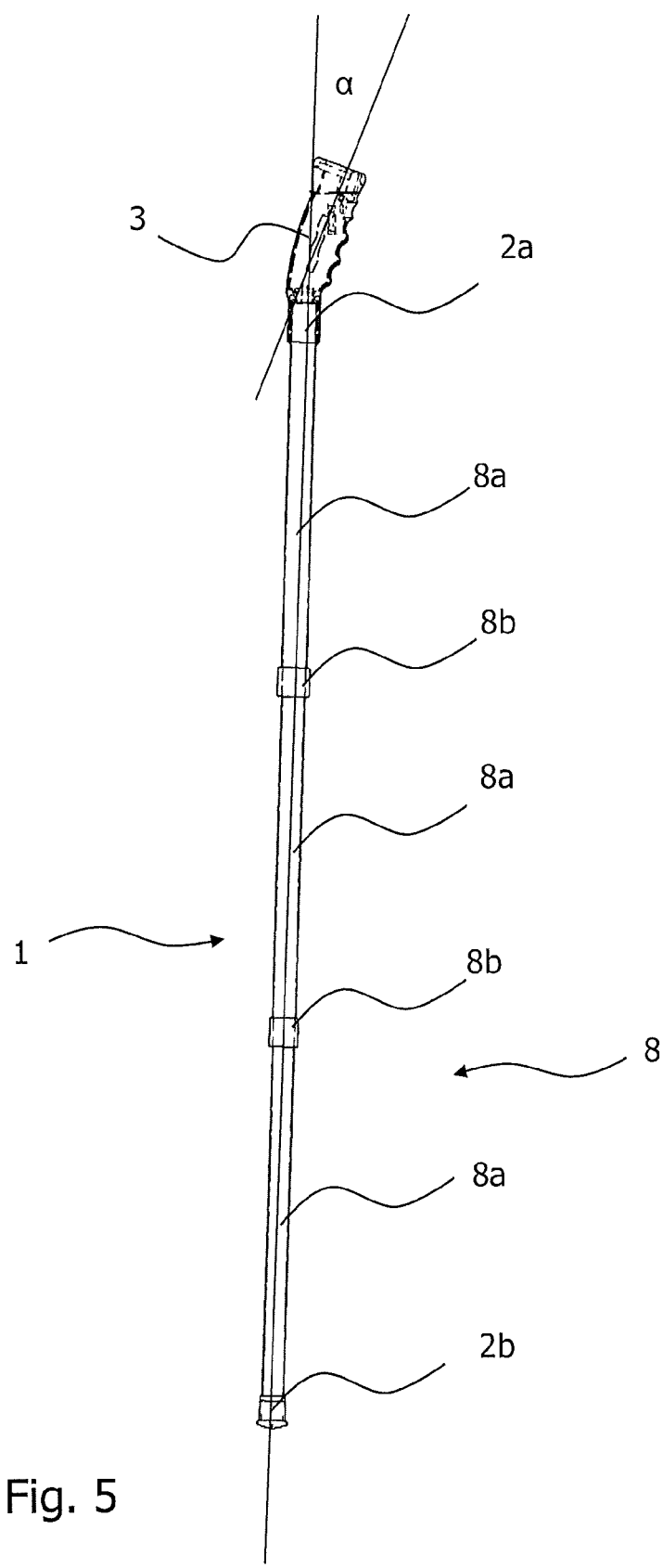
FIG. 5 illustrates an embodiment of the sports and general pole element in first side view.
Figure 6:
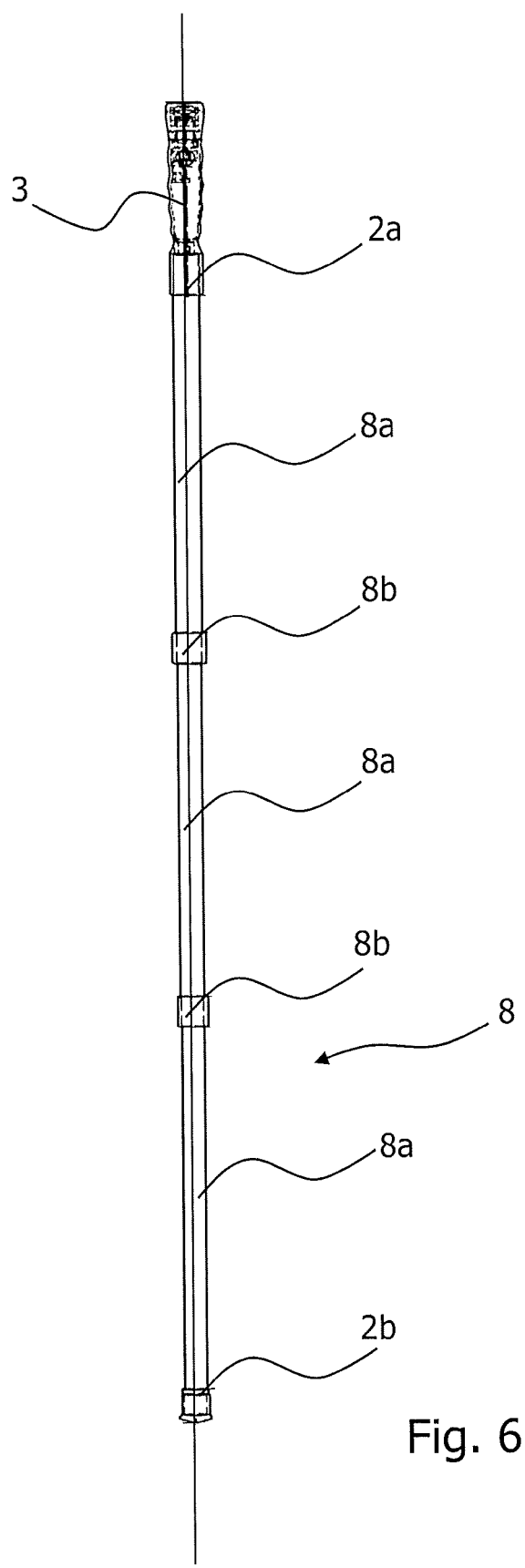
FIG. 6 illustrates an exemplary embodiment of the sports and general pole element in a front view.
Figure 7:
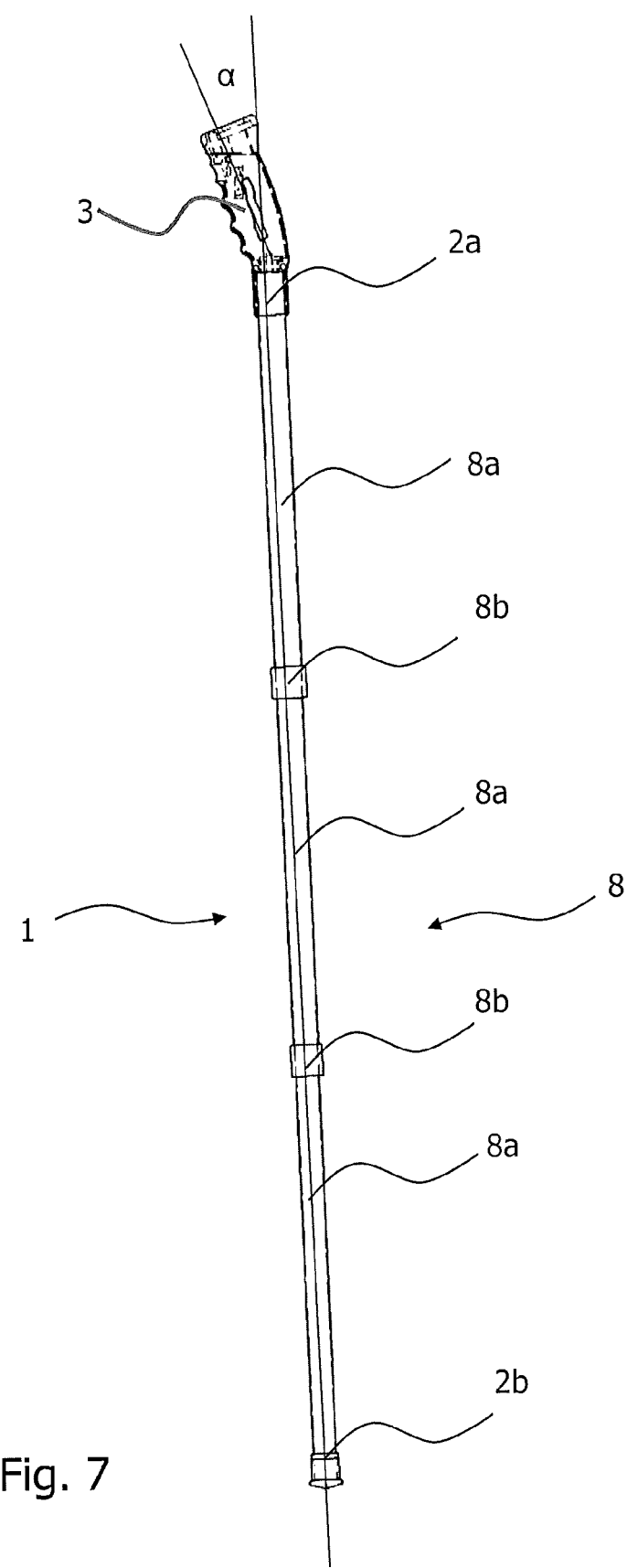
FIG. 7 illustrates an exemplary overall view of the sports and general pole element in a second side view.

FIGS. 5, 6 and 7 illustrate various overall views of embodiments of the sport and general pole element from various perspectives. In the illustrated embodiments the telescope rod 8 is completely pulled out. The individual telescope segments 8a are kept in position by length arresting devices 8b in an interior the spiral cable recited supra is arranged under tension.

The telescope rod 8, the individual telescope segments 8a and the length arresting devices 8b are made from a magnetically neutral material with an advantageously overall mass, for example a plastic material or a carbon material, in particular a carbon reinforced plastic material. Thus the mass of the pole is reduced and the geophysical locating components in or at the pole are not influenced negatively. Furthermore this does not influence the radio reception of the radio receiver in the pole.

The embodiment illustrated in FIGS. 5, 6 and 7 includes a sensor arrangement made from two partial sensors 2a, b. The first partial sensor 2a is arranged directly proximal to the handle 3 and detects the magnetic field at a sufficient distance from the ground. It is used as a reference sensor. The second partial sensor 2b is arranged at a tip of the pole proximal to the ground and is encapsulated with a magnetically neutral detective cover. Thus the pole tip can be placed on the ground without any risk of damaging the partial sensor 2b and the pole tip can be used like a regular pole tip.

FIGS. 5 and 7 furthermore illustrate that the handle 3 of the pole extends in its longitudinal axis essentially in a direction of the longitudinal axis of the telescope rod 8 and deviates therefrom at the most by an acute angle α which is required by the ergonomics of the hand of the user in order to comfortably hold the pole and to be able to use it as a hiking pole, walking pole or as a Nordic walking pole in the usual manner. The angle α can also be zero, wherein the longitudinal axis of the handle 3 coincides with the longitudinal axis of the telescope rod 8.

Figure 8:
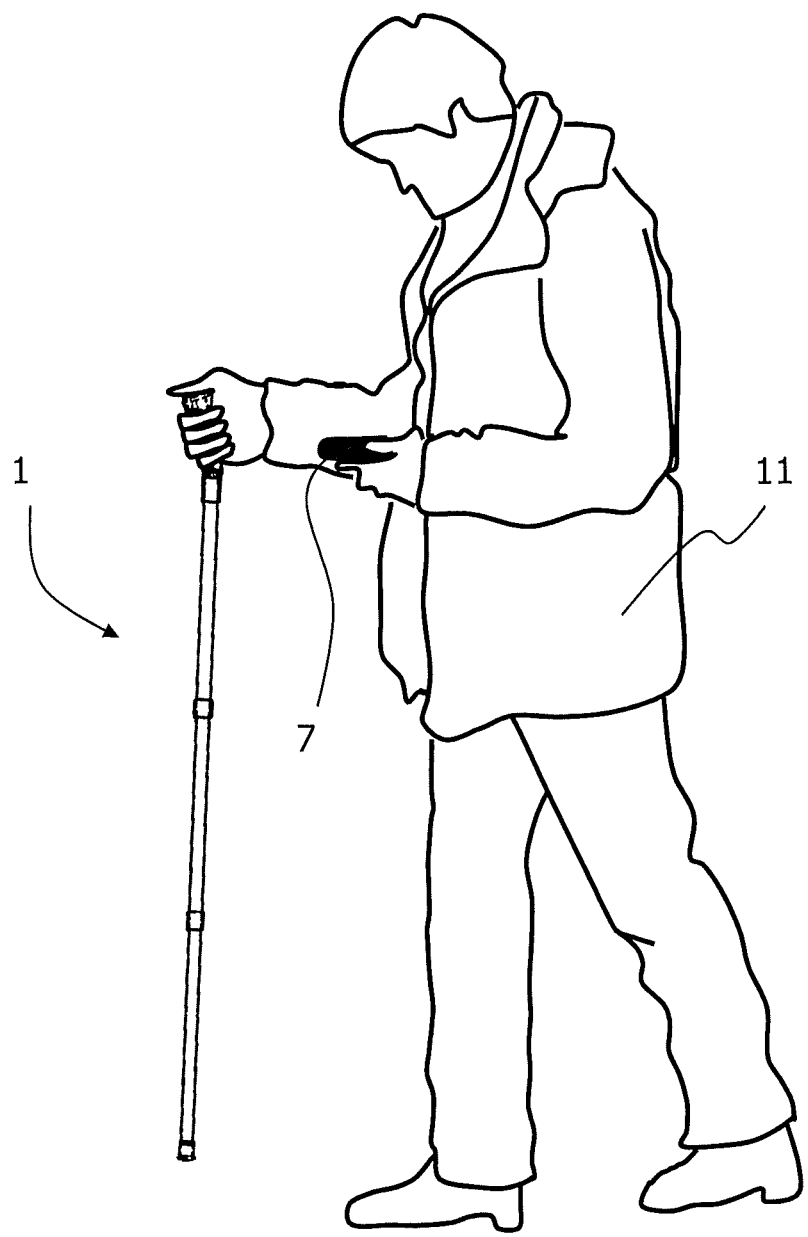
FIG. 8 illustrates an exemplary first embodiment of a handling of the sports and general pole element during geophysical locating.

FIG. 8 illustrates an exemplary first embodiment of a handling of the general pole element 1 during geophysical locating. The user 11 holds the general pole element at its handle like a regular hiking or walking pole. Thus the longitudinal axis of the pole is essentially oriented perpendicular to the ground as illustrated in the figure. The user can use the pole element 1 as a walking aide, place it on the ground and he can move normally over the land.

Thus, a wireless data transmission is performed between the general pole element 1, this means the integrated and concealed electronic components arranged therein and an external evaluation display unit 7 which the user 11 can hold for example in a respective other hand or which the user can also carry in a concealed manner. The evaluation and display unit 7 is in particular a mobile telephone, a smart phone, tablet computer, a PDA or a comparable mobile device. The data can also be put out to a data or video goggle which provides a virtual representation of the scanned area to the user.

Wireless data transmission are provided for example via WLAN, WIFI or a Bluetooth connection, an IR connection or comparable wireless communication channels.

Figure 9:
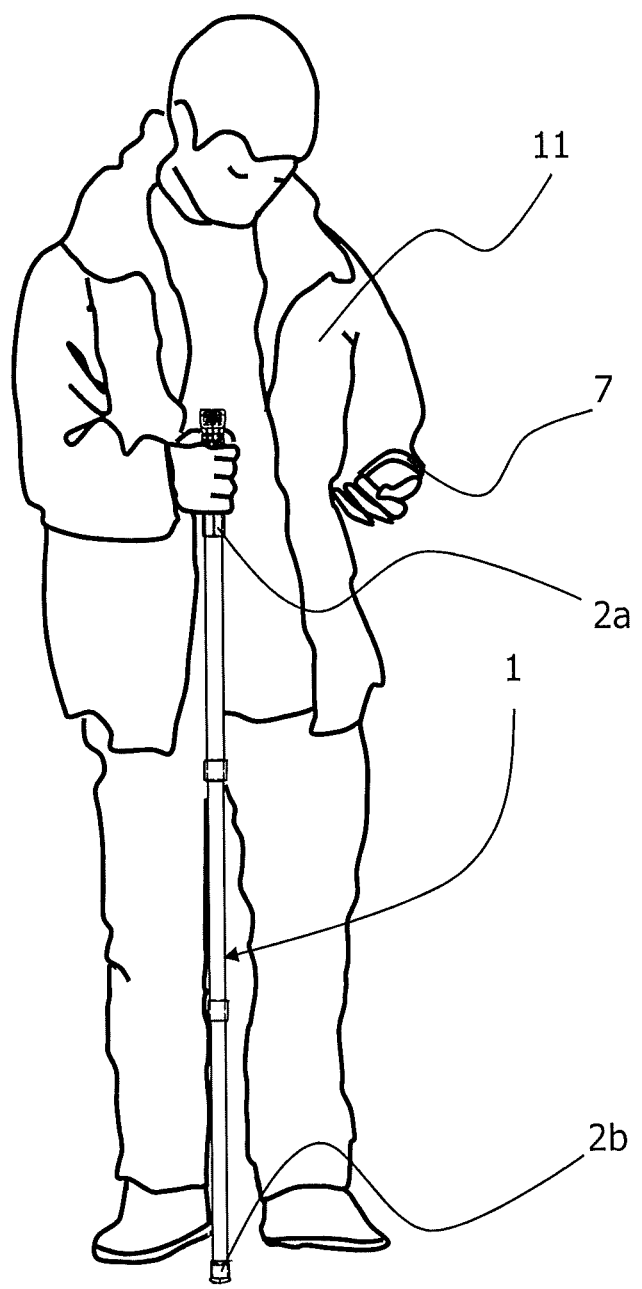
FIG. 9 illustrates an exemplary second embodiment of a handling of the sports and general pole element during geophysical locating.

FIG. 9 illustrates an application of the general pole element 1 during geophysical locating of objects in the ground. The user 11 supports the general pole element at its handle like a regular pole and moves the pole tip towards the ground. In the present embodiment the first partial sensor 2a is proximal to the handle and the second partial sensor 2b is arranged in the portion of the pole tip. When placing the pole onto the ground or when moving the pole to the ground surface as illustrated the two partial sensors 2a and 2b perform a differential measurement of the surrounding magnetic field, wherein the partial sensor 2a forms the reference sensor as recited supra. The sensor data of the first partial sensor 2a and of the second partial sensor 2b are respectively transmitted to the evaluation and processing unit 7 and are stored, processed and evaluated accordingly therein. In particular a differential value from both sensor data is computed therein or both sensor data are combined in another manner.

Thus, the measuring method described supra has the same motion pattern for an unsuspecting user like the typical handling of a traditional pole which does not indicate magnetic field detection or geophysical locating.

For reasons of measuring precision it is rather not recommended for the user to place the pole tip onto the ground with the typical movements of a hiking pole when performing geophysical locating while the user over the land and performs locating at a sequence of measuring points. In principle this is possible and can be considered during signal processing as a matter of principle. At least the pole is supported vertical at a certain distance from the ground surface in this case as illustrated in FIG. 9 and carried along in this position while walking over the land.

However the pole can be dragged over the ground during the locating process as long as the ground is even enough or the user can remain stationary at a particular location of the land, he can put the pole down support himself on the pole and can also convey the outward impression of a completely inconspicuous use of a typical hiking pole, wherein concealed locating processes are performed and the measuring data is processed in the evaluation and processing unit.

Figure 10:
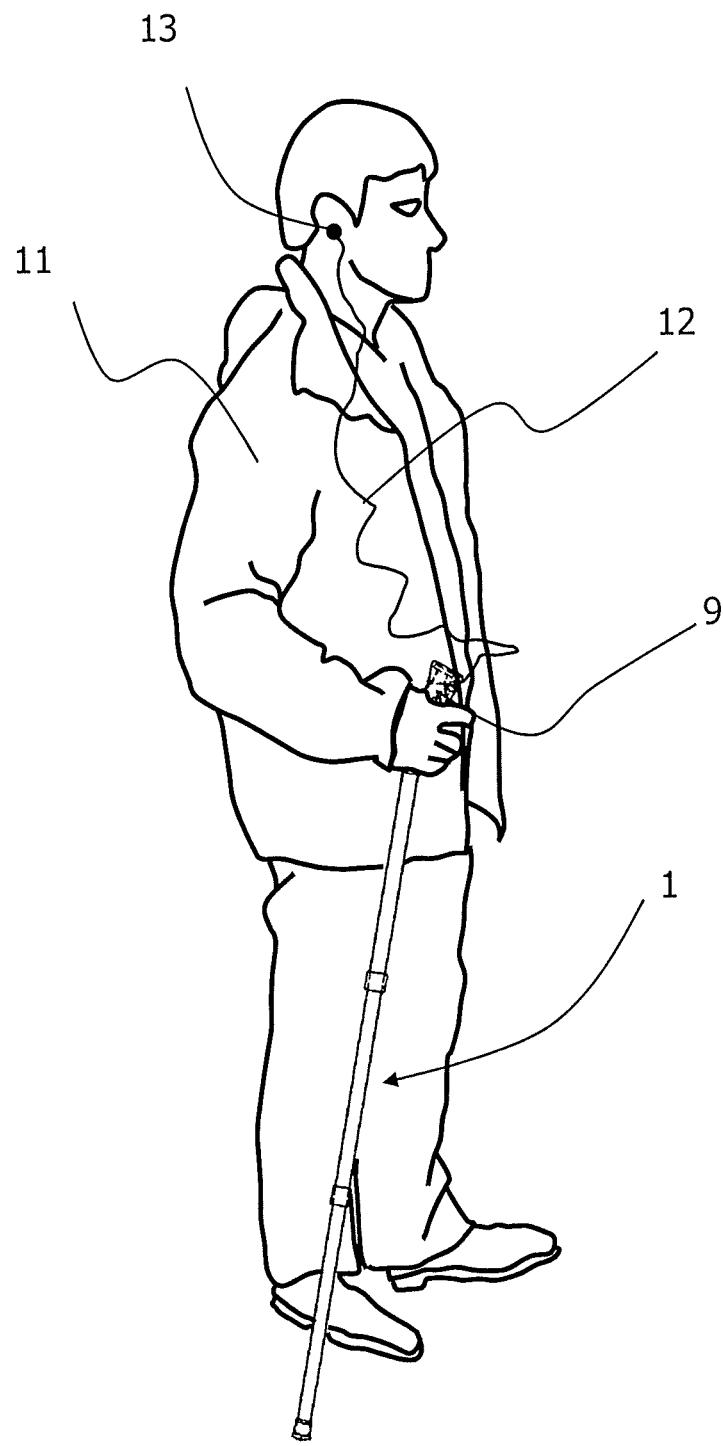
FIG. 10 illustrates a third embodiment of the handling of the sports and general pole element during, thus when using the installed radio receiver.

FIG. 10 illustrates an exemplary embodiment of handling the sports and general pole element herein when using the installed radio transmitter 9. In this embodiment a cable 12 is inserted into the interface 6 recited supra and configured as a plug in socket, wherein the cable 12 is connected with a head seat 13 which is arranged in an ear of the user 11. Thus the user can hear the radio programs received by the radio receiver 9 within the pole.

Certainly also particular detector signals can be transmitted while performing geophysical locating wherein an impression is conveyed for an external observer that the user only listens to the radio while moving over the land and in reality geophysical locating data is collected through the detector arrangement of the pole.

The subsequent FIGS. 11-15 illustrate exemplary processing and program sequences on the evaluation and display unit based on exemplary program displays. These are performed for example when executing a so called app on a so called smart phone or a comparable mobile device.

Figure 11:
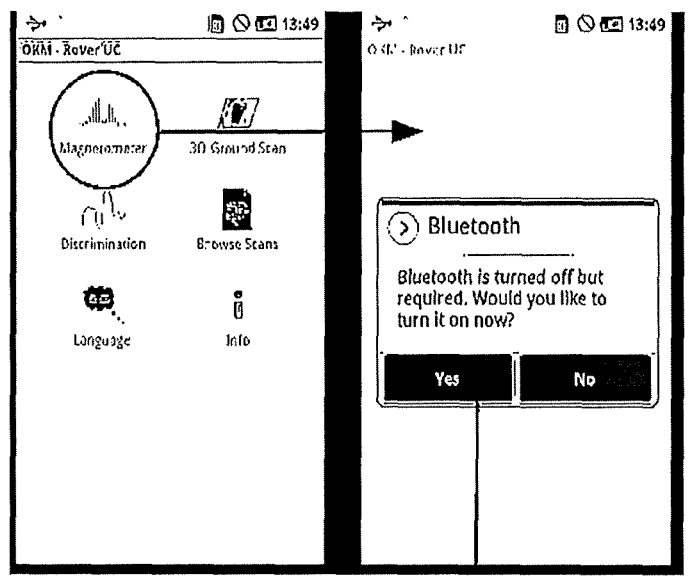
FIG. 11 illustrates an exemplary wireless connection established via blue tooth.
Figure 11:
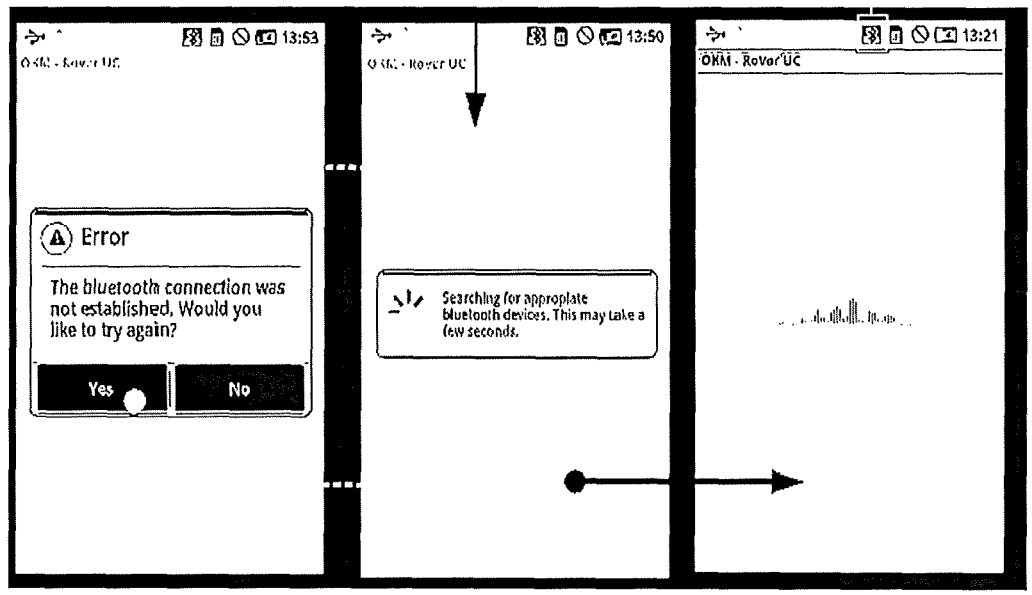
Figure 12:
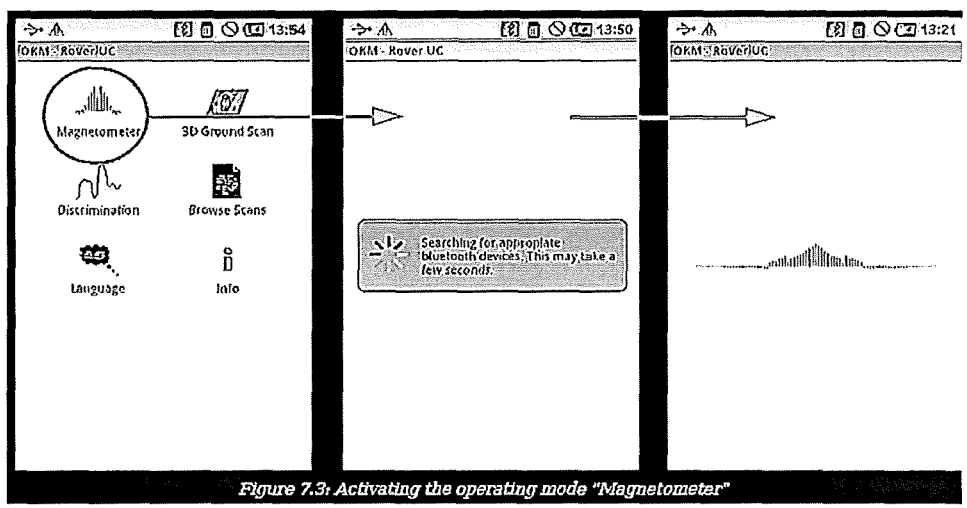
FIG. 12 illustrates an exemplary embodiment of a display in magnetometer mode.

FIG. 11 illustrates an exemplary wire connection establishment by a Bluetooth between the mobile device and electronic components within the sport and general pole element based on plural screen dialogs. In the illustrated embodiment the wireless connection is automatically established when an app for executing geophysical locating is launched on the mobile device. The mobile device initially provides the output that a respective locating device, in this case the locating components within the sport and general pole element are being searched. At the latest at this point in time the magnetic locating components in the pole element are activated and switched on by the operating unit 5 at the handle of the sport and general pole element.

As soon as a wireless connection has been established the display of the mobile device directly displays a current signal level of a running measurement of the magnetic field.

The display of the mobile device is subsequently used as a display of the geophysical locating components in the sport and general pole element.

The app running on the mobile device or the respective program components include options for various operating modes of the geophysical locating function. One of the optional operating modes is illustrate in FIG. 12. This is a so called magnetometer mode. In this operating mode punctiform magnetometer measurements are performed and there is an option to calibrate the geophysical locating components within the pole, in particular the sensor arrangement made from the partial sensors recited supra. This function provides the base function for geophysical locating.

Figure 13:
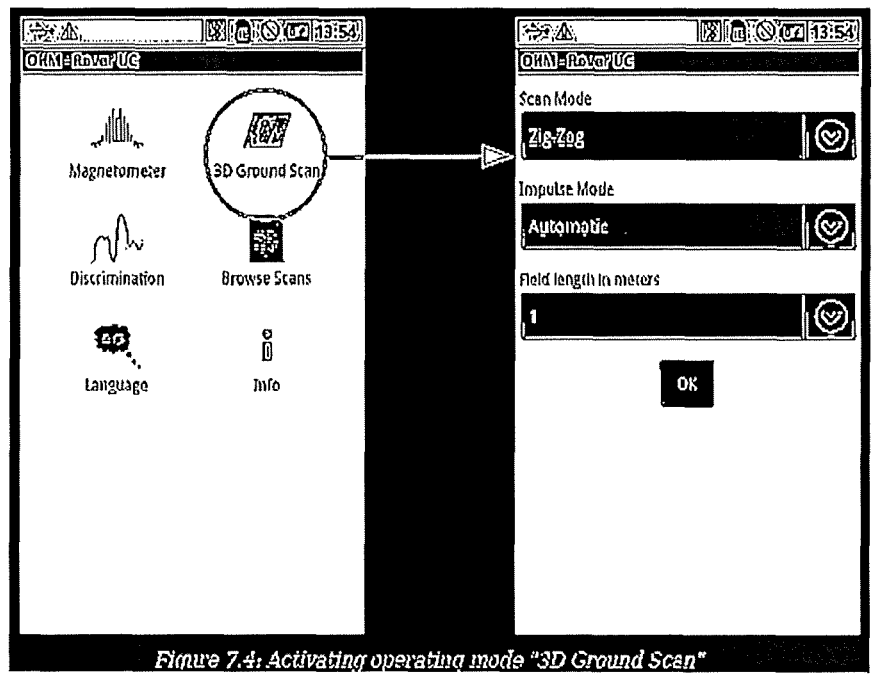
FIG. 13 illustrates an exemplary embodiment of a choice between various operating modes and an associated display.

FIG. 13 illustrates another operating mode of geophysical locating. This operating mode is designated as "3-D ground scan". According to this function an area to be scanned is walked over by the user with the pole element in a particular manner, wherein the magnetic locating components continuously determine magnetic detector data and transmit it to the mobile device. In combination therewith a position determination of the location of the user on the land is performed. This is advantageously performed by a GPS functionality provided in the mobile device or a comparable position determination device. The position data in its entirety forms a two dimensional surface of the scan land portion to which respective magnetic measuring data is associated as a third value, so that delivers a three dimensional group of values which can be subsequently processed.

The instant embodiment facilitates performing plural scanning methods, this means walking the area to be scanned in various ways. Thus the app provides a selection between a so called zig zag mode and a parallel mode. Thus measurements are performed either on a forward path or backward path or only in one running direction.

Furthermore also a so called discrimination scan mode is also possible. This is used for further characterizing a located object and in particular to gain a statement whether this is a ferro magnetic object or a non ferro magnetic object or a cavity or a non-metal object. Thus the user remain stationary in place and moves the sports and general pole element in short parallel movements over the object that has been broadly located in the ground. Thus particular characteristic signatures in the magnetic field are captured for subsequent evaluation, wherein the signatures provide sufficient indication what type of object is actually provided. This scan mode facilitates local scanning with improved resolution.

Furthermore also a function "browse scans" is possible. This function facilitates calling up preexisting scan data and displaying on the display on the mobile device. Thus the scanned area is represented in two dimensions, wherein the determined locating data is for example color coded or visualized in gray scales, wherein the located structure is clearly shown in the image.

When calling up stored scans through the function "browse scans" the scan data can be displayed as a three dimensional representation wherein it is possible to analyze the scan data through a respective operation of the mobile device, in particular through an actuation of a touch screen for virtually rotating the three dimensional display in space.

Figure 14:
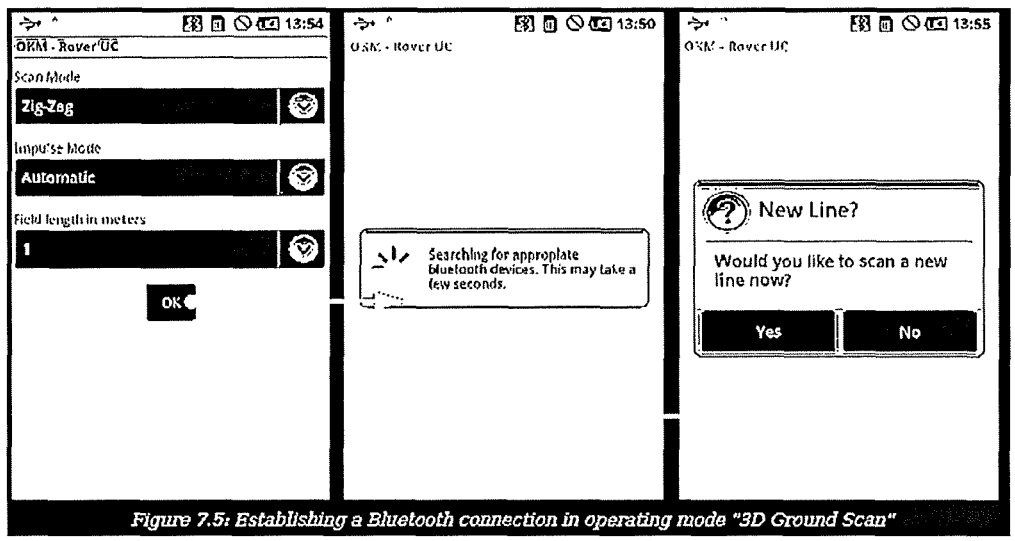
FIG. 14 illustrates an exemplary embodiment of a dialog for defining a predetermined scan area in a piece of land.

Furthermore the user can determine the size of the land to be scanned on the mobile device and triggering the respective measurement can either be performed in an automated or manual manner. For this purpose FIG. 14 illustrates an exemplary user dialog wherein the user is asked after running through a scan line whether an additional line shall be walked or not.

Figure 15:
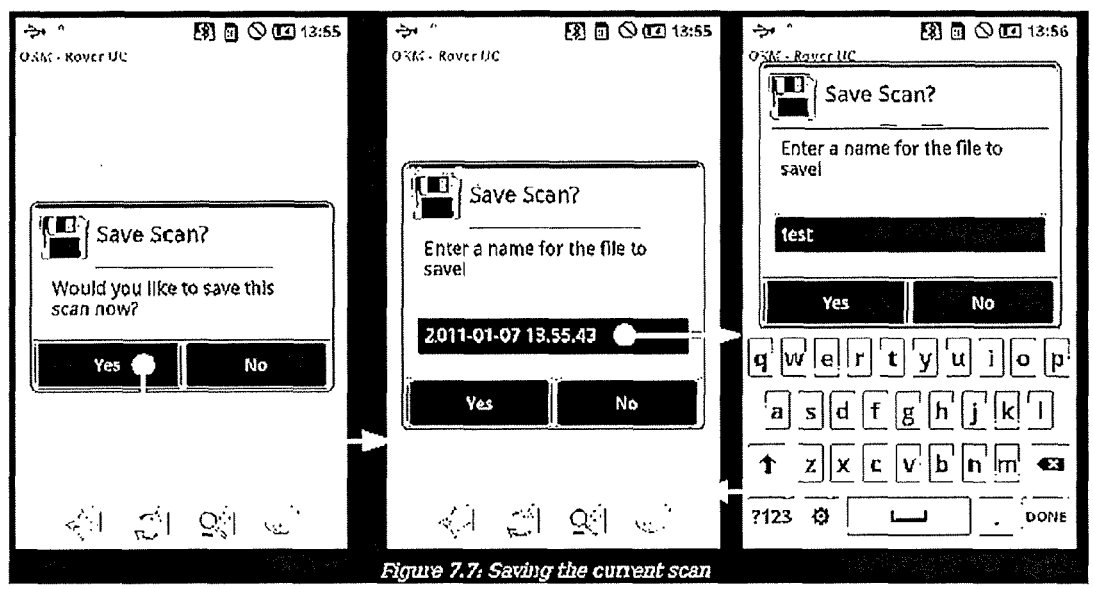
FIG. 15 illustrates an exemplary embodiment of a dialog for storing recorded scan data.

The respectively captured locating data is then stored on the mobile device in combination therewith FIG. 15 illustrates an exemplary dialog in which the user can allocate file names for storing the respective scan.

Certainly a data transfer of the stored data material from the mobile device to a stationary device, for example a PC can be performed easily. For this purpose well known transmission methods, in particular data transmissions via USB interface can be used.

The invention was described with reference to advantageous embodiments. Further embodiments can be derived from the dependent claims and from the skill of a person skilled in the art.

REFERENCE NUMERALS AND DESIGNATIONS 1 general pole element
2 sensor
2a first partial sensor
2b second partial sensor
3 handle
4 battery
4 operating unit
6 interface
7 evaluation- and display unit
8 telescopic rod
8a telescopic element
8b length arresting device
9 radio receiver
10 signal lamp
11 user
12 cable
13 head set

The invention claimed is:

1. A sports- and general pole element, comprising components for an arrangement for operating a handheld geophysical locating device with at least one sensor, a power supply, an operating unit, and an interface for wireless data transmissions,
   wherein the components are arranged concealed in a body of the sports- or general pole element and wireless transmission of locating data is provided through the interface to a mobile evaluation- and display unit,
   the sports- or general pole element is configured tubular as a telescopic rod including at least two telescopic segments,
   the telescopic rod includes at least one length adjustment device for the telescopic segments and a spiral cable is arranged within the telescopic rod, wherein the spiral cable causes a self acting contraction of the telescopic rod when the length arresting device is disengaged, and
   the spiral cable is configured as a radio antenna for a radio receiver arranged in a portion of the handle.

2. The sports- and general pole element according to claim 1, wherein the sensor is configured as a passive differential sensor comprising a first partial sensor and a second partial sensor, wherein the first partial sensor is arranged as a reference sensor in the portion of the handle of the sports- and general pole element, and the second partial sensor is provided as a ground sensor in a tip portion of the sports- and general pole element.

3. The sports- and general pole element according to claim 1, wherein the mobile evaluation- and display unit is a tablet computer or a PDA.

4. The sports- and general pole element according to claim 1, wherein the interface for wireless data transmission is configured as a Bluetooth- and/or WiFi-interface.

5. The sports- and general pole element according to claim 1, wherein the sports- or general pole element is a hiking pole or a walking pole or an umbrella or a sun umbrella or a Nordic walking pole.

6. The sports- and general pole element according to claim 1, wherein the sports- or general pole element includes a handle that is oriented essentially in a direction of a longitudinal axis of the sports- and general pole element.

7. The sports- or general pole element according to claim 6, wherein the operating unit and/or the power supply is arranged in the handle.

8. The sports- or general pole element according to claim 1, further comprising a first passive sensor, and a second passive partial sensor, wherein the spiral cable connects the first passive partial sensor included in a portion of the handle and the second passive partial sensor included in a portion of the pole tip, wherein the first passive partial sensor and the second passive partial sensor form a differential sensor arrangement.

9. The sports- or general pole element according to claim 1, wherein the sports- or general pole element includes a radio receiver.

10. The sports- or general pole element according to claim 1, wherein the mobile processing and display unit includes a memory unit.

* * * * *